United States Patent [19]

Pruex

[11] 4,228,681
[45] Oct. 21, 1980

[54] CRANE LOAD COMPUTER

[76] Inventor: Roger Pruex, 70, rue Philippe Dartis, 93031 Epinay sur Seine, France

[21] Appl. No.: 903,745

[22] Filed: May 8, 1978

[30] Foreign Application Priority Data

May 13, 1977 [FR] France .................................. 77 14779

[51] Int. Cl.³ ............................................. G01L 5/16
[52] U.S. Cl. ..................................... 73/133 R; 364/567
[58] Field of Search ............... 73/133 R; 212/39 MS; 340/685; 364/567; 235/92 WT

[56] References Cited

U.S. PATENT DOCUMENTS

| | | | |
|---|---|---|---|
| 3,638,211 | 1/1972 | Sanchez | 212/39 MS X |
| 3,740,534 | 6/1973 | Kezer et al. | 340/685 X |
| 3,819,922 | 6/1974 | Horn et al. | 340/685 X |
| 3,866,199 | 2/1975 | Eberhard et al. | 340/685 |
| 4,003,482 | 1/1977 | Cheze | 340/685 X |
| 4,052,602 | 10/1977 | Horn et al. | 340/685 X |

*Primary Examiner*—Jerry W. Myracle
*Attorney, Agent, or Firm*—J. Harold Nissen

[57] ABSTRACT

A device for checking the loading state for a lifting appliance such as a crane. The device includes a calculation member to determine the weight suspended from the crane hook, and a memory adapted to receive diagrams to store information established by the crane manufacturer. The diagrams provide the values of maximum admissible load depending on the values of at least one paramenter which defines the state of the crane. A central unit is provided which determines the maximum admissible load for each of the values, and then the central unit includes a comparator to compare the maximum admissible load with the value of the actual load of the lifting appliance. The central unit also includes a checking mechanism to determine whether the central unit is operating correctly.

6 Claims, 6 Drawing Figures

CRANE LOAD COMPUTER

BACKGROUND OF THE INVENTION

The invention relates to a device for checking a loading state, i.e. a piece of electronic equipment which at any instant determines the weight of a mass suspended from the hook of a lifting appliance and compares it with a load diagram corresponding to the optimum possibilities of the machine.

This device for checking a loading state is especially designed to equip telescopic cranes, but its use may be extended to all types of lifting appliance such as lattice cranes and tower cranes whereof the parameters taken into account in these two examples are much less numerous.

Generally, it is known that telescopic cranes are so-called quick-action lifting appliances and are generally self-propelled and self-contained. However, if the fact that they are able to travel on the road fairly quickly has a certain advantage, this also imposes strict rules for their use, since they are lifting appliances which operate with an overhang.

The lifting capacity of a telescopic crane is limited by the stability in certain operating positions and by mechanical strength in other positions.

The maximum load which a crane is able to lift thus depends on numerous parameters such as: the reach, the length of the jib, the angle of the jib, the adjustment, the orientation of the turret etc.

All these parameters are involved according to very complex laws, such that the manufacturers of lifting appliances are compelled to provide load diagrams which are peculiar to each type of crane.

These load diagrams define the range of use of the crane very well, but are not always respected by the user who always encounters enormous difficulties in permanently evaluating certain factors, such as the load, the reach or even the angle of the jib.

The invention therefore relates to a device for checking a loading state, whose essential purpose is to collect all possible information relating to the appliance, to process this information in order to obtain the parameters used in the diagrams and to compare these parameters with the load diagrams provided by the manufacturer.

Finally, this equipment provides the crane driver with essential information for driving the crane, namely the loading state which, for a given operating position, is the ratio of the actual load suspended from the hook to the maximum admissible load.

Normally, this single piece of information is sufficient to enable the crane driver to work without exceeding the limits of his crane, but other pieces of information, such as the reach and angle of the jib could be given to the driver as an indication.

According to the invention, in order to provide a signal representative of the loading state of the crane, the checking device firstly comprises a memory section in which all the information contained in the diagrams provided by the manufacturer is stored, these diagrams providing the values of maximum admissible load depending on the various values of two parameters defining the geometric state of the crane, a central unit which firstly receives the actual values of the various parameters of the crane and secondly the value of the load on the crane hook.

By means of memorized values, this central unit determines the maximum admissible load and essentially compares this load with the actual load on the crane hook. It is also able to provide the ratio of actual load/maximum admissible load which as afore-mentioned is the loading state of the crane.

It is obvious that the determination of the maximum admissible load depending on the stored values depends on the nature of the diagrams provided by the manufacturer and on the capacity of the memories used in the device for checking the loading state.

When the capacity of the memories is considerable and sufficiently accurate diagrams are available, the function of the central unit is reduced to simple addressing which, for each of the values of the pair of parameters, makes it possible to obtain the value of the maximum admissible load for this pair of parameters.

When the value of the parameters measured corresponds to a maximum admissible load whose value is between the value of two maximum admissible loads stored in the memory, without reducing the reliability of the system, the central unit is able to make an approximation consisting of taking the lower value of the two said maximum admissible loads.

When the diagrams provided by the manufacturer are accurate but on the other hand the capacity of the memories is limited, it is possible to divide each of the curves drawn on the diagrams into sections comprising a simplified mathematical model and to memorise these mathematical models with programming of the central unit such that for each of the values of the pairs of parameters, a central unit calculates the load using the mathematical model assigned to the section corresponding to these parameters. In this case also, when sufficiently complete diagrams are available, it is possible to carry out the afore-mentioned approximation.

When sufficiently complete diagrams are not available, it is possible to calculate the authorized load by incrementation from the values given on the manufacturer's reference diagram whose values have been memorised.

One embodiment of the invention will be described hereafter as a non-limiting example, with reference to the accompanying drawings in which:

DESCRIPTION OF THE PREFERRED EMBODIMENT

Figure 1:
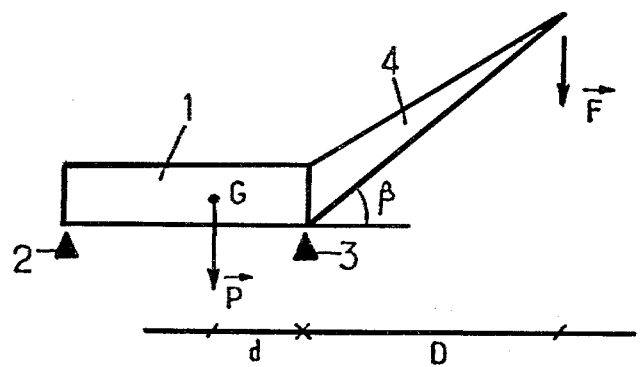
FIG. 1 is a diagrammatic illustration of a lifting appliance making it possible to show the criteria of stability.

It will firstly be recalled that in a lifting appliance such as that shown diagrammatically in FIG. 1, which comprises a chassis 1 resting on the ground at 2 and 3 and on which a jib 4 is pivoted, the stable condition of this appliance is provided by the relationship:

$$F.D. \leq P.d$$

in which
F is the force exerted on the top of the jib 4 by the load.
D is the distance from the support point 3 of the chassis on the ground to the vertical passing through the end of the jib (reach).
P is the weight of the appliance acting at its centre of gravity G and
d is the distance from the vertical passing through the support point 3.

It is obvious that in no case should the force F exerted by the load at the top of the jib 4 exceed the value:

$$F_{max} = (dP)/D$$

It will also be noted that in the case of high loads, of certain methods of securing the chassis to the ground or of the use of certain special equipment, the mechanical strength limits solely the maximum load which the appliance can lift:

$$F < F_{max}$$

Consequently, the stability of a crane depends firstly on the geometric parameters of this crane and secondly on the strength of the materials used.

Consequently, owing to the fact that these parameters are involved according to three very complex laws, the manufacturers are compelled to provide load diagrams which are peculiar to each type of crane which in general, for a certain number of values of the main parameters of the crane, provide the value of the maximum admissible load, these parameters being essentially the length l of the jib, the reach P or the angle $\beta$ which the jib forms with the horizontal.

These diagrams are most frequently in the form of graphs having two entries representing namely:
the maximum load as a function of the reach P in the case of a load diagram for an appliance which is not fixed in position,
the maximum load as a function of the angle $\beta$ which the jib forms with the horizontal (constant load for a given angle whatever the length of the jib) which is generally the case when the appliance operates with a small jib or a manual extension.

It is obvious that with this type of diagram, calculation of the maximum admissible load causes no considerable problem.

However, in most cases, these diagrams are constituted by graphs comprising on the Y-axis and on the X-axis, two variables, for example the reach and the load and a series of curves representative of the maximum admissible load for a series of values of the third variable, for example for different values of the length of the jib.

Figure 2:
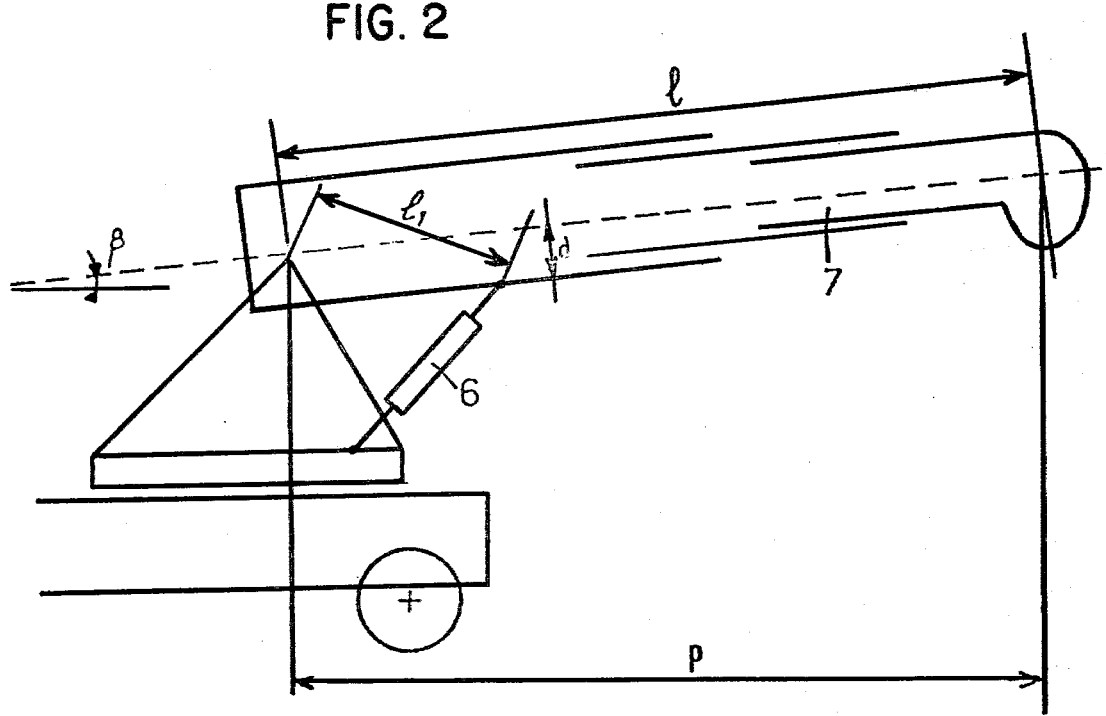
FIG. 2 is a diagrammatic illustration of a crane having a telescopic jib.
Figure 3:
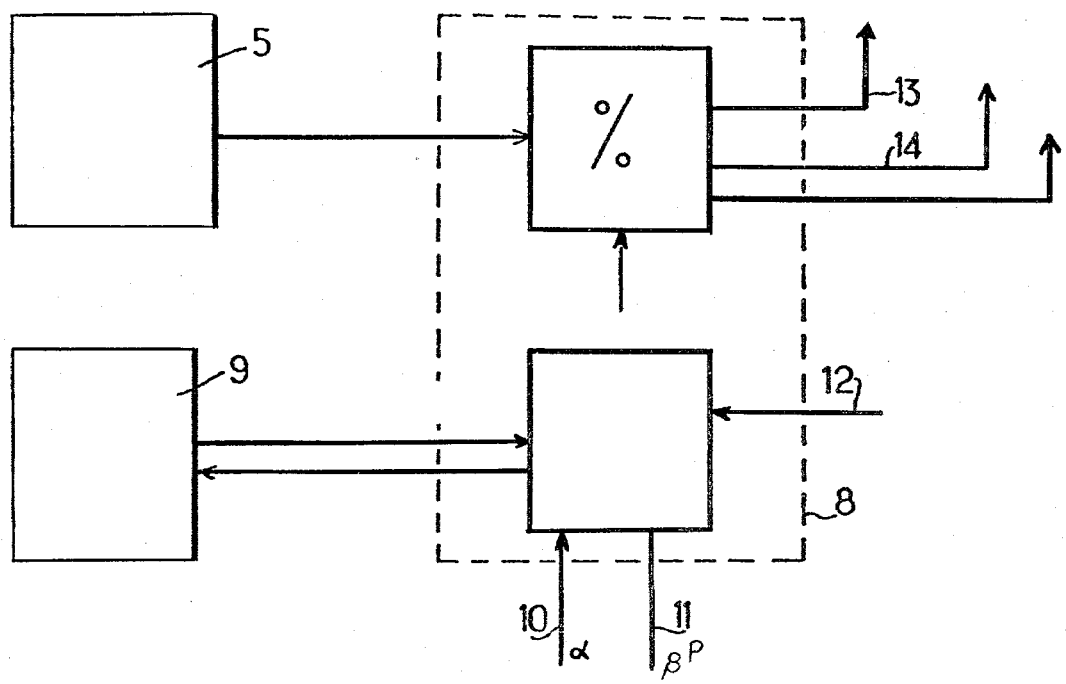
FIG. 3 is a theoretical block diagram of a device for controlling a loading state according to the invention.

With reference to FIG. 3, the device for checking the load according to the invention firstly comprises a system facilitating calculation of the load on the hook of the crane (block 5). This calculation may be carried out for example from the pressure in the jacks 6, (FIG. 2), making it possible to vary the inclination of the crane and this is by firstly calculating the total load acting on the hook of the crane, then by subtracting from the total load determined in this way, the weight of the jib 7 acting on the hook of the crane.

Thus, in the case of a telescopic crane of the type shown in FIG. 2, the total load P acting on the hook of the crane may be obtained by means of the relationship:

$$P = C^{te} \times P_{jack} \times \frac{1}{l} \quad \frac{\cos \alpha}{\cos \beta} \text{ (corrective term)}$$

in which
$C^{te}$ is a constant,
$P_{jack}$ is the pressure detected in the jack 6,
$\alpha$ is the angle which the jib 7 of the crane forms with respect to the jack 6,
$\beta$ is the angle which the jib 7 forms with respect to the horizontal.

The weight of the jib 7 acting on the hook of the crane may in turn be calculated by means of a system using a switching device which, for each of the geometric states of the crane and each of the lengths of the jib, provides a weight corresponding to that provided by the diagrams of the manufacturer.

The signal representative of the calculation of the load, supplied by the calculation system 5 is transmitted to the central unit 8 of a digital calculator, which produces the ratio between this signal and a signal representative of the maximum admissible load determined from the manufacturer's diagrams.

To determine the maximum admissible load, the device for checking the load comprises a memory 9 connected to the central unit, in which the data provided in the manufacturer's diagrams are stored.

The central unit also receives at its inputs 10, 11, 12, the various parameters of the crane, such as the angle $\beta$, the reach P or corrective values, from which, for example by means of a logic control member and a register of addresses, it collects the information relating to the maximum admissible load supplied by the memory corresponding to said parameters.

This information serves directly for determining the loading state of the crane.

It should be noted that the central unit may also serve for the display of characteristic parameters of the crane and for the display of the value of the loading state of the crane (output 13). It may also compare this value with a predetermined value corresponding to a safety reference and if this safety reference is exceeded it is able to control an alarm system (output 14) and/or a system preventing any dangerous movement (output 15).

As afore-mentioned, the determination of the maximum admissible load may be carried out in a different manner according to the nature of the diagrams provided by the manufacturer and the capacity of the memories used.

Figure 4:
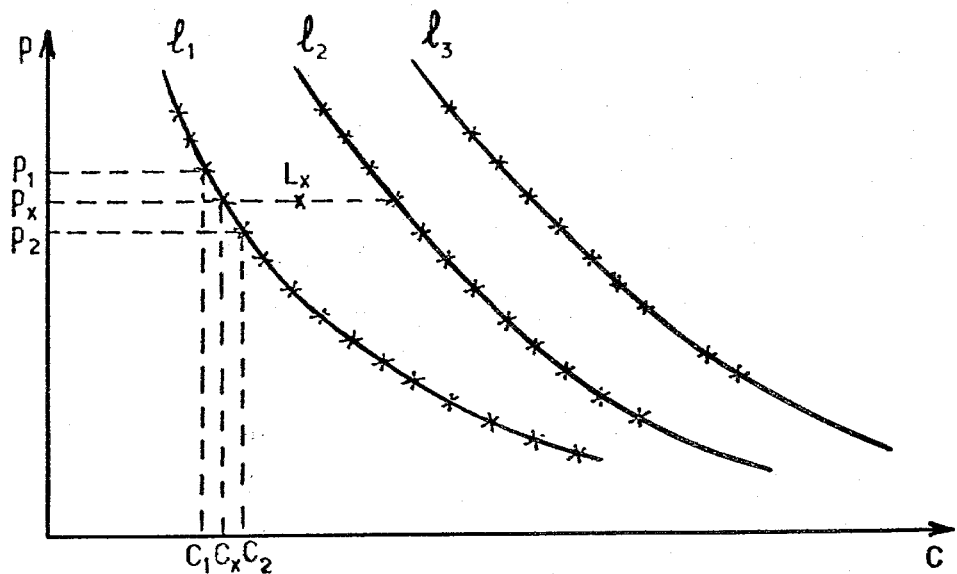
FIG. 4 shows a diagram provided by the manufacturer.

In the case where the diagrams provided by the manufacturers are very detailed and the capacity of the memories is sufficiently great, the central unit may proceed as illustrated in FIG. 4.

FIG. 4 shows a graph in which the Y-axis indicates the reach P of the appliance and the X-axis indicates the load C. This graph shows the curves of the maximum admissible load for various values of the length l of the jib.

Memorization and addressing of these graphs may be carried out in various ways which are not included in the scope of the invention. Only the various load values memorised have been shown on these curves $L_1$, $L_2$, $L_3$, by crosses.

Reading of this memory by the central unit takes place in the following manner:

In the case where the reach P and the length of the jib l correspond exactly to a value C memorised, the reading is direct;

In the case where the length l corresponds to a memorized length, for example $l_1$, but where P has a value $P_x$ which does not correspond to a value C and which is between the reaches $P_1$ and $P_2$ corresponding to loads $C_1$ and $C_2$ memorized, to the extent that the points C are sufficiently close together, it is possible to make an approximation, consisting of taking as the value of $P_x$, the value $P_1$ corresponding to the load $C_1$, $C_1$ being less than $C_2$;

In the case where the length l of the jib has a value $L_x$ comprised between two consecutive values, for example $l_1$ and $l_2$, to the extent that the values $l_1$ and $l_2$ are sufficiently close together, it is possible to opt for the curve corresponding to the lowest maximum load value, in this case the value $l_1$.

In the case where one does not have a memory having a capacity adequate to cover a sufficiently high number of points in order that it is possible to use the preceding method, one can envisage dividing the curves $L_1 L_2$... into sections and adding a mathematical model to these sections.

Figure 5:
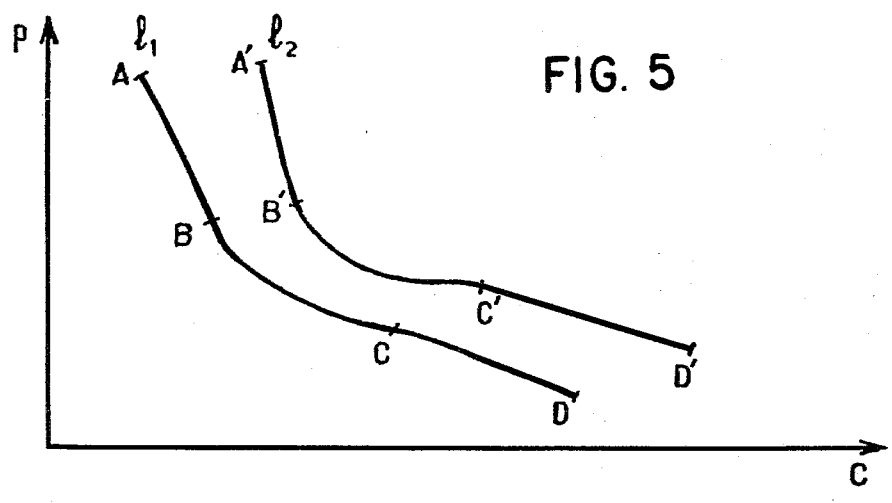
FIG. 5 is a diagrammatic illustration making it possible to illustrate the manner in which the curves formed on the diagrams may be divided into sections.

Thus, for example in the curve illustrated in FIG. 5, instead of memorizing the points appearing in the section AB, it is possible to use a micro-instruction making it possible to obtain directly in this section, the maximum admissible load from the reach and this is by means of the mathematical model which, in this case, is in the form $y = ax + b$. The same is true for the section BC, whose mathematical model could be for example in the form $y = ax^2 + bx + c$.

In the case where a memory having a small capacity is available, it is also possible to use and memorize a limited number of values provided by the manufacturer's diagrams and to effect calculation of the load by incrementation from these values.

Figure 6:
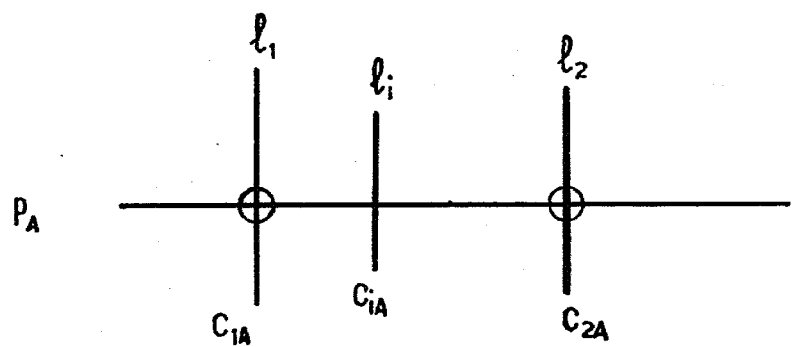
FIG. 6 is a diagrammatic illustration making it possible to illustrate the process of incrementation used when the diagrams provided by the manufacturer are insufficiently detailed and/or when a memory having a sufficient capacity is not available.

With reference to FIG. 6, $C_{1A}$ and $C_{2A}$ are the values of loads authorised by the manufacturer's diagram, the reach is PA and the length of the jib $l_1$ and $l_2$.

A digital calculation system is thus provided for dividing the value $C_{2A} - C_{1A}$ into N increments. In this respect it will be noted that it is necessary to take a sufficiently high value of N in order that the accuracy of the incrementation is greater than the accuracy required for the overall system.

An appropriate digital signal thus makes it possible to calculate the value:

$$C = C_1 + k \frac{C_2 - C_1}{N}$$

in which k represents the grade of the increment corresponding to the length $l_i$ and whose expression is:

k = a whole part of $$\frac{N(l_i - l_1)}{l_2 - l_1}$$

the expression $$C_i = C_1 + k \frac{C_2 - C_1}{N}$$

thus represents the maximum load which the lifting appliance may raise with the reach PA and for a jib length $l_i$.

Thus, each time the appliance operates with a reach parameter or a jib length parameter comprised between two characteristic values of the reference diagram, the digital calculation system will calculate a load value compared by the afore-described incrementation method.

It will be noted that in a device for checking the loading state, such as those afore-described, it is indispensable to provide the possibility of checking the correct operation of the latter before it is used. This check generally takes place on starting-up the lifting appliance.

This test should be able to make the following checks:
(1) that all the measurements taken by the various sensors—pressure sensors, pendulum, winders—are exact;
(2) that all the calculations carried out in the central unit of the CEC are exact;
(3) that the members relating to safety are in a good working condition. The latter are visual and sound alarms, members indicating the loading state and members which prevent dangerous movements.

To carry out such a test, the invention proposes:
(1) To provide on the control desk, an indication by a digital display (or analog display, by means of a galvanometer) of the load supported by the crane,
(2) that the operator has at his disposal a button for initiating the test,
(3) to place the crane in a well-determined and systematic operating configuration.

In this case, by introducing at an advantageous point of the system for calculating the load acting on the hook of the crane, a perfectly calibrated voltage which is the imaginary effect of a load raised, one obtains a test as above-described, on condition:

that this imaginary load is above any value allowed by the manufacturer;
that the value of this load can be easily identified by the user, therefore a round value instantaneously recognizable on the member for displaying the load. This recognition may take place if necessary by means of an indicator (galvanometric display) digital or analog display.

To carry out the test, the operator must actuate the member controlling the initiation of the test.

If, in response, all the alarms are triggered and the dangerous movements are blocked, he may consider that the safety mechanisms are in good working order.

Reading-off on the indicator the theoretical value introduced makes it possible to check that the value of the test is the correct value. The operator can thus be certain that the entire chain of sensors and the calculation chain is operating correctly.

I claim:

1. Device for checking the loading state of a lifting appliance including a crane having a telescopic jib provided with a hook from which a load is adapted to be suspended, comprising:
   a calculation member for determining the weight of the suspended load on the hook of the crane;

memory means including memories storing information derived from diagrams previously prepared, the diagrams providing values of various admissible loads which depend on various values of at least one parameter defining the geometric state of said applicance;

a central unit coupled with said calculation member and said memory means for receiving information relating to the parameters of said crane for determining the maximum admissible load for each of the values stored in said memory means;

said unit producing as an output a value desired for the load by a process of incrementation which consists of dividing the intervals between two maximum admissible load values corresponding to two values of a parameter defining the geometric state of the crane, in which:

$C_1$ is a lower value for one of said maximum admissible load values from the previously prepared diagrams, $C_2$ is a higher value for another of said maximum admissible load values from the previously prepared diagrams, N is the number of increments in which the values $C_2-C_1$ is divided.

$C_i$ is a maximum admissible load value falling between said load values $C_1$ and $C_2$ for which there is no previously prepared diagram and information stored in said memory, the value of the maximum admissible load $C_i$ is determined according to the expression:

$$C_i = C_1 + k \frac{C_2 - C_1}{N}$$

in which K is the grade of the increment corresponding to the parameter and whose expression is $$k = \left( \frac{N(l_i - l_1)}{l_2 = l_1} \right)$$

in which:

$l_i$ is the length of said jib for the load $C_i$, $l_1$ is the length of said jib for the load $C_1$, and $l_2$ is the length of said jib for the load $C_2$;

said central unit including a comparison means to compare the value of the maximum admissible load of said lifting appliance with the value of the actual suspended load as determined by said calculation member; and, a testing device for checking that the loading state is operating correctly, said testing device comprising a member for introducing into the calculation chain a perfectly calibrated voltage of a load raised of greater value than any value inserted into said memory from the previously prepared diagrams and being easily identifiable, whereby to enable the checking of the correct operation of the checking device before it is used.

2. Device according to claim 1, wherein said central unit comprises:

simple addressing means to provide the value of the maximum admissible load for each of the values of at least one parameter defining the geometric state of said crane, where sufficiently accurate previously prepared diagrams and said memories having a large capacity are available, and said central unit carries out an approximation consisting of taking the smallest value of two successive maximum admissible loads stored in said memory, when the value of the parameters measured correspond to a maximum admissible load on said hook whose value is between the value of two successive maximum admissible loads stored in said memory means.

3. Device according to claim 1, wherein when the previously prepared diagrams are accurate and when the capacity of the memories is limited, curves contained in the previously prepared diagrams are divided into sections having a mathematical model and these mathematical models are stored with the programming of said central unit such that for each of the values of the pairs of parameters, said central unit includes means to calculate the maximum admissible load using the mathematical model assigned to the section corresponding to said parameters.

4. Device according to claim 1, 2 or 3, wherein said central unit produces for each operating position of said crane, the ratio of the actual load suspended from said hook to the maximum admissible load.

5. Device according to claim 1, 2 or 3, wherein said memory means has a small capacity having a limited number of said memories, and a limited number of values provided by said previously prepared diagrams is stored in said memory means.

6. Device according to claim 1, said central unit including means for producing as an output the grade increment k comprising:

a subtractor for making the subtraction $l_i-l_1$;

a multiplier multiplying the result of said subtraction by the increment number N; and a subtractor for making the subtraction $l_2-l_i$; and a divider for providing the entire integral part of the ratio expression $$\frac{N(l_i - l_1)}{l_2 - l_1},$$

the result of said ratio expression being representative of the number k.

* * * * *